United States Patent [19]

Paszek et al.

[11] 3,771,052
[45] Nov. 6, 1973

[54] METHOD OF MEASURING A RECTIFIED VOLTAGE AND A RECTIFICATION CIRCUIT THEREFOR

[76] Inventors: Wladyslaw Paszek, ul. Mata 3;
Piotr Dripz, ul. Grazyny 11/21;
Edward Nycz, ul. Wieczorka 4/38,
all of Bielsko-Biata; Walenty Wycisk, Kolonia Brzozowa 3,
Goezatkowice Zdroj, all of Poland

[22] Filed: May 24, 1971

[21] Appl. No.: 146,325

[30] Foreign Application Priority Data
May 25, 1970 Poland............................ P-140 865

[52] U.S. Cl. ................................. 324/119, 321/8 R
[51] Int. Cl. ............................................ G01r 19/22
[58] Field of Search .................... 324/119; 321/8, 9, 321/10

[56] References Cited
UNITED STATES PATENTS
2,294,065    8/1942    Anderson............................ 324/119

Primary Examiner—Rudolph V. Rolinec
Assistant Examiner—Ernest F. Karlsen
Attorney—Waters, Roditi, Schwartz & Nissen

[57] ABSTRACT

A method of measuring a rectified voltage by means of a rectification circuit. This method is particularly suitable to high-voltage systems, in which the rectifier includes great numbers of series-connected rectifying elements. The measuring method consists of separating from a load current its components namely the forward current and the reverse current which are flowing through a rectifier. The separation of the forward current and the reverse current is obtained by means of an additional low-power rectifying set provided with a resistor across which is produced a signal proportional to the rectified d-c output voltage.

2 Claims, 1 Drawing Figure

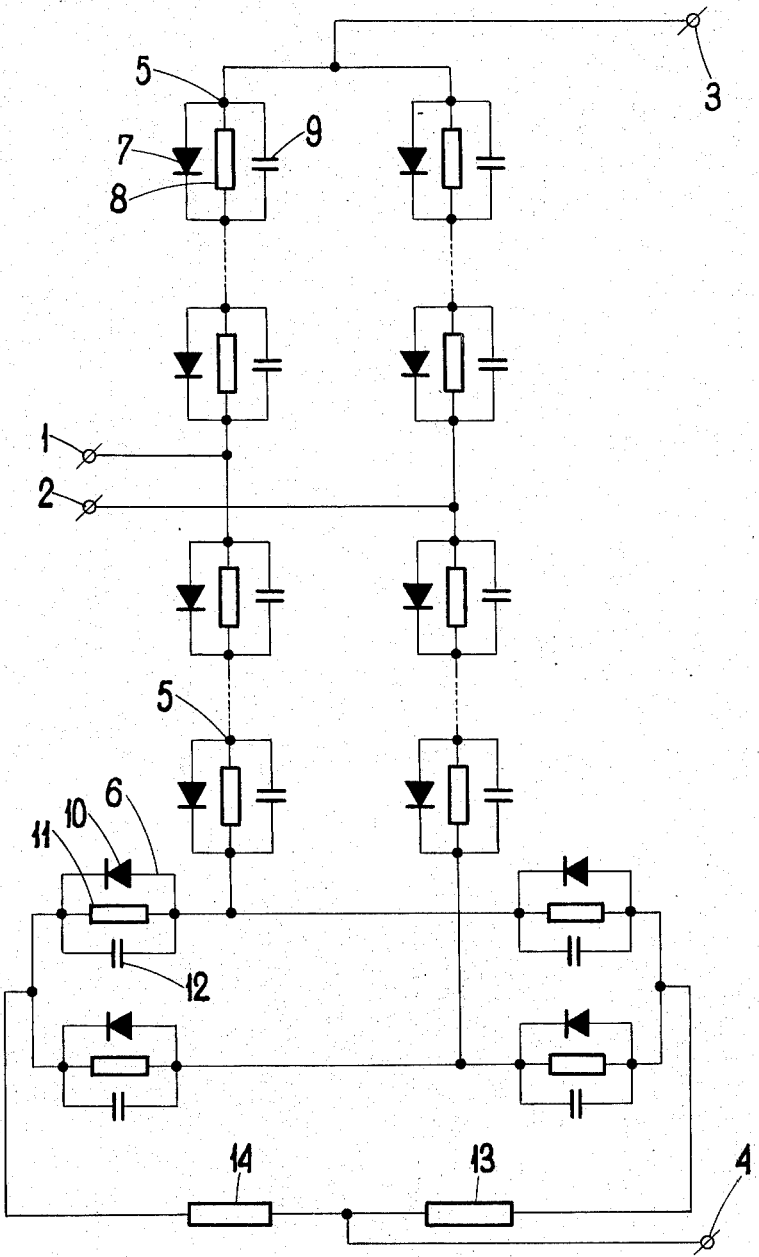

METHOD OF MEASURING A RECTIFIED VOLTAGE AND A RECTIFICATION CIRCUIT THEREFOR

FIELD OF INVENTION

This invention relates to methods of measuring the d-c voltage output in rectifier bridge connections and a rectification circuit therefor, and particularly to methods and circuits suitable for use with power-supply systems for electro-static precipitators.

PRIOR ART

In known methods, the measurement of a rectifier direct current output voltage for control purposes or for automatic regulation is effected directly by connecting a measuring element to rectifier outputs or by means of voltage dividers.

There is also known a further method of obtaining measurement signals which are to some extent proportional to the rectifier direct-cuttent output voltage by measuring suitable transformed alternating voltage on the primary winding of a rectifier supplying transformer.

A principal disadvantage of the method of direct measuring lies in the fact that the said method can be supplied only to low voltages.

The method of measuring by means of a divider is inconvenient because it necessitates introducing additional elements in great numbers and this can result in decreased reliability of the assembly. A voltage divider which is working in a high-voltage direct current or pulsing current electric field constitutes the feablest part of the rectifier assembly.

Said further method of measuring an alternating voltage has also a basic imperfection, since the produced measuring signal shows serious errors caused by non-linear relations in the transformer and in the rectifier.

SUMMARY OF INVENTION

An object of the present invention is to provide a method of measuring the rectifier d-c output voltage by means of a rectifying circuit therefor, which avoids the imperfections mentioned above and which produce a signal proportional to the d-c output voltage. In accordance with the invention a rectifier in bridge connection has terminals of two bridge arms composed of rectifier elements connected to the one diagonal of a low-power bridge composed of rectifier elements with a multiple higher back resistance while the second diagonal of the low-power bridge makes a circuit with series-connected resistors, one of said resistors having a voltage which is proportional to a the d-c output voltage and another having a voltage proportional to the forward current.

BRIEF DESCRIPTION OF DRAWING

One embodiment of the invention is shown by way of example in the accompanying drawing in which the sole FIGURE is a schematic diagram of a rectification circuit equivalent circuit in single-phase bridge connection.

DETAILED DESCRIPTION

The rectification circuit in the drawing has an A.C. voltage applied to the A.C. bridge diagonal of the high voltage rectifier by means of input terminals 1 and 2. The rectified D.C. output voltage appears on the D.C. bridge diagonal and particularly at terminals 3 and 4. The rectification circuit comprises the rectifier elements 5 and 6.

The high voltage rectifier elements 5 have as components a diode 7, a resistor 8 and capacitor 9. Resistor 8 and capacitor 9 are used for protection of the diodes in the high voltage rectifier as in the power supply systems of electrostatic precipitators. The rectifier elements 6 of the measuring bridge have as components a diode 10, a resistor 11 and a capacitor 12. In special cases, the resistor 11 and capacitor 12 can be substituted by the equivalent reverse resistance and equivalent internal capacitance of non ideal diode 10. One end point of the diagonal of the high voltage rectifier is connected to the first output terminal 3. The other arm ends of the high voltage bridge composed of elements 5 which are not connected to the first D.C. output terminal 3 are inserted into the A.C. diagonal of the measuring bridge composed of elements 6. The D.C. diagonal of the measuring bridge is closed through series-connected resistors 13 and 14.

The common point for the said resistors 13 and 14 is simultaneously the second D.C. output terminal 4 of the high-voltage rectification circuit.

The resistance 11 is much higher than the resistance 8 for obtaining a high power in the measuring member supplied by the voltage on resistor 13, whereby the voltage on the resistor 13 is approximately proportional to the D.C. output high voltage. The voltage on the resistor 14 is proportional to the forward current of the high voltage rectifier.

The load current flowing through the load connected to terminals 3 and 4 of the rectifier constitutes an algebraic sum of a forward current and reverse current of the high voltage rectifier. The separation of particular components from the load current is obtained in the measuring rectifier bridge.

As to the components, the forward current flows mainly through the resistor 14 and the reverse current through the resistor 13, whereby a signal approximately proportional to D.C. output voltage is measured.

The resistors 13 and 14 can for example represent the internal resistances of measuring instruments.

What is claimed is:

1. A rectification circuit for measuring a rectified high voltage comprising a plurality of first and second rectifier elements, each including a diode, resistor and capacitor in parallel, said first rectifier elements being in a modified high voltage rectifier bridge connection including an A.C. diagonal including input terminals adapted for being fed from an A.C. high voltage source and further including a D.C. diagonal part with one end constituting a first D.C. output terminal adapted for being connected to a load, said second rectifier elements being in a measuring bridge connection, said high voltage rectifier bridge connection including first and second arms extending from said A.C. diagonal and connected at said one end and having third and fourth arms extending from said A.C. diagonal and having ends which are separated from each other, said measuring bridge connection including an A.C. diagonal, the ends of said third and fourth arms being connected to the A.C. diagonal of the measuring bridge connection, two series connected resistors, said measuring bridge connection including a D.C. diagonal, means connecting said two series connected resistors across the latter said diagonal, a common point connecting said two resistors and constituting a second D.C. output terminal adapted for being connected to said load, the voltage across one of said two resistors being approximately proportional to a D.C. output voltage appearing across said D.C. output terminals and the voltage across the second of said two resistors being proportional to the forward current through the high voltage rectifier connection.

2. A circuit as claimed in claim 1 wherein the resistance of the second rectifier elements is of a value which is substantially higher than that of the first rectifier elements.

* * * * *